(12) United States Patent
Maita et al.

(10) Patent No.: US 6,261,654 B1
(45) Date of Patent: Jul. 17, 2001

(54) COMPOSITE RESIN FILM AND METALLIC SHEET COATED WITH SAME

(75) Inventors: Norimasa Maita; Takaaki Okamura; Hiroshi Nakamura; Yasuo Ohhashi; Atsuo Tanaka, all of Yamaguchi-ken (JP)

(73) Assignee: Toyo Kohan Co, Ltd., Tokyo (JP)

( * ) Notice: Subject to any disclaimer, the term of this patent is extended or adjusted under 35 U.S.C. 154(b) by 0 days.

(21) Appl. No.: 09/214,489

(22) PCT Filed: Jul. 4, 1997

(86) PCT No.: PCT/JP97/02324

§ 371 Date: Jun. 25, 1999

§ 102(e) Date: Jun. 25, 1999

(87) PCT Pub. No.: WO98/01301

PCT Pub. Date: Jan. 15, 1998

(30) Foreign Application Priority Data

Jul. 5, 1996 (JP) .................................................... 8-01860

(51) Int. Cl.[7] .......................... B32B 15/08; B32B 15/18; B32B 15/20; B32B 27/08; B32B 27/36

(52) U.S. Cl. ...................... 428/35.9; 428/215; 428/216; 428/337; 428/339; 428/412; 428/458; 428/480; 428/35.8; 428/36.9

(58) Field of Search ................................. 428/480, 412, 428/458, 35.7, 35.8, 35.9, 36.9, 215, 216, 337, 339

(56) References Cited

U.S. PATENT DOCUMENTS 4,874,647 * 10/1989 Yatsu et al. .......................... 428/35.7
5,585,177 * 12/1996 Okamura et al. ..................... 428/341
5,780,158 * 7/1998 Asai et al. ............................ 428/412

FOREIGN PATENT DOCUMENTS

| | | |
|---|---|---|
| 6-226915 | 8/1994 | (JP) . |
| 6-255022 | 9/1994 | (JP) . |
| 7-009616 | 1/1995 | (JP) . |
| 7-186330 | 7/1995 | (JP) . |
| 7-290666 | 11/1995 | (JP) . |

* cited by examiner

Primary Examiner—Vivian Chen
(74) Attorney, Agent, or Firm—Browdy and Neimark

(57) ABSTRACT

A composite resin film enabling a severe forming processing, in which a drum portion or a can is made thinner than a conventional one when the resin film coats a metallic sheet to be formed into a can, maintaining a favorable flavor even when time elapses after contents are filled in the resulting can, and having a high impact resistance which makes the film free from crack even if the resin film is acted on by an impact from outside before and after the filling of contents, and a metallic sheet coated with the resin and having a laminated structure of the composite resin film. The metallic sheet coated with the composite resin film is such that a resin having three layers, an upper layer composed of a resin entirely composed of polyester resin, an intermediate layer composed of a blended resin containing polyester resin and polycarbonate resin, and a lower layer composed of a blended resin containing polyester resin and polycarbonate resin, is laminated on a metallic sheet.

18 Claims, No Drawings

COMPOSITE RESIN FILM AND METALLIC SHEET COATED WITH SAME

TECHNICAL FIELD

The present invention concerns a composite resin film and composite resin laminated metallic sheet mainly applied for can stock material. More in detail, it concerns a three layered resin film comprising an uppermost layer and a lowermost layer mainly composed of polyester resin having definite structure and an intermediate resin layer composed of blended resin of polyester and poly carbonate having definite structure, and a resin covered metallic sheet on which one side or both sides are covered with the three layered resin.

BACKGROUND TECHNOLOGY

Recently, can stock material in which a bi-axially oriented polyester resin film is laminated on a metallic sheet has been developed, and can using the same is on the market. Although the polyester resin covered metallic sheet is widely applicable for can stock material because of its excellent economical efficiency and properties, the orientation of the polyester resin layer after the lamination should be reduced to the extent that can body should not be damaged during forming when the polyester resin covered metallic sheet is applied to cans which are formed by heavy forming process such as drawn and stretch-formed can. On the other hand, when the polyester resin layer after the lamination scarcely has orientation, that is, when it is in an almost amorphous state, formed cans or those packed with some content collide with each other during conveying at high speed continuously, and if one of the cans is dented, a crack will form in the polyester resin layer of the dented portion, resulting in local corrosion of the can. Therefore, the orientation of the polyester resin layer after the lamination should be controlled within an extremely narrow suitable range in order to obtain a polyester resin covered metallic sheet having stable quality. Furthermore, even if the orientation of the polyester resin layer is controlled within a suitable range, when the body of a stretch-formed can, packed with carbonated beverage at a low temperature, is dented during conveying at a low temperature, cracks which are problems for practical use will be caused in the polyester resin layer, and the can will be locally corroded. In short, the polyester resin covered metallic sheet has inferior impact resistance, that at a low temperature in particular, and is hard to be stably produced.

Several attempts have been made to improve the impact resistance at a low temperature. Laid open Japanese patent Hei 7-9616 discloses a polycarbonate resin covered metallic sheet, in which the impact resistance at a low temperature is greatly improved without strict control of the orientation to be within a narrow range while keeping excellent flavor retention ability, which is one of the properties essential for can stock. However, a steep cost down of can has been recently demanded, and additional thinning of the can wall thickness is being requested. Moreover, the development of a resin covered metallic sheet which can be formed into 2 piece can, applied for more corrosive content than that packed in the conventional can, is being required. As a result, a resin film used for a resin covered metallic sheet should have stable adhesion during forming as well as extremely excellent adhesion during forming and impact resistance than conventional one because the can wall part is deeply dented and the cracks, which are fatal defects for the protection of content, are easily caused in the resin film by outer impact since the can wall portion is extremely thinned, and further because it is requested to make possible to pack more corrosive content into it.

The double layered composite resin covered metallic sheet disclosed in Laid open Japanese patent Hei 7-9616 may be suitably applied for can of which can wall portion is thinned to the conventional extent. However, the blended resin layer of the lower layer should concurrently have adhesion to the metallic sheet during forming and impact resistance. It is difficult for the resin of lower layer to blend polyester resin having superior adhesion to a metallic sheet but inferior impact resistance and polycarbonate resin having superior impact resistance but inferior adhesion to a metallic sheet at the most suitable blending ratio in which the adhesion and the impact resistance can concurrently reconcile. Therefore, the blending ratio should be in a certain range in which the properties of both resins are compromised. Thus, it is difficult to apply the doubly layered composite resin covered metallic sheet for the use where the can wall portion is more thinned than usual to reduce the weight of the can unless the can is packed with less corrosive content. For example, when most part of the lower layer is composed of polyester resin so as to have adhesion during forming necessary for the thinning of can wall portion to be thinner than that of a conventional one, the impact resistance necessary for resin film at the can wall portion which is greatly thinned is remarkably decreased.

It is the objective of the present invention to produce a composite resin film and a metallic sheet covered with the composite resin film which can be formed into a can formed by heavy forming having more thinned can wall portion than a conventional one when it is laminated on a metallic sheet, which has excellent flavor retention ability after the thus formed can is packed with content and stored, and which has excellent impact resistance even when the can body is dented by an outer impact before or after the content is packed into it.

DISCLOSURE OF THE INVENTION

Claim 1 of the present invention is characterized in that it is a composite resin film comprised of laminating three resin layers of (a), (b) and (c) described as follows:

(a) uppermost layer: resin layer mainly composed of polyester resin comprising the recurring unit shown in formula (1) described below (b) intermediate layer: blended resin layer composed of 1 to 99 weight % of polyester resin comprising the recurring unit shown in formula (1) described below and 1 to 99 weight % of poly carbonate resin comprising the recurring unit shown in formula (2) described below (c) lowermost layer: resin layer mainly composed of polyester resin comprising the recurring unit shown in formula (1) described below:

[Basic structure of polyester resin]

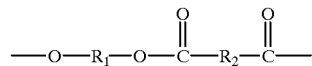

Formula (1)

wherein $R_1$ is alkylene group of carbon number 2 to 6, and $R_2$ is alkylene group or allylene group of carbon number 2 to 24:

Formual (2)

[Basic structure of poly carbonate resin]

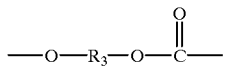

wherein $R_3$ is aliphatic hydrocarbon of carbon number 2 to 10 or aromatic hydrocarbon of carbon number 6 to 18.

Claim 2 shows one of following (d) to (g) or a blend of more than one of (d) to (g) as favorable example of the polyester resin used as the lowermost resin layer of the composite resin film of the present invention:
(d) polyethylene terephthalate
(e) poly-butylene terephthalate
(f) copolyester resin mainly composed of ethylene terephthalate unit
(g) copolyester resin mainly composed of butylene terephthalate unit In claim 3, a blended resin composed of 1 to 99 weight % of polyester resin shown in formula (1) and 1 to 99 weight % of polycarbonate resin shown in formula (2) is also applicable as the lowermost layer.

In claim 4, bisphenol A polycarbonate resin is preferred as the polycarbonate resin contained in the intermediate layer.

Claim 5 shows one of following (i) to (l) or a blend of more than one of (i) to (l) as a preferred example of the polyester resin contained in the intermediate layer:
(i) polyethylene terephthalate
(j) poly-butylene terephthalate
(k) copolyester resin mainly composed of ethylene terephthalate unit
(l) copolyester resin mainly composed of butylene terephthalate unit Claim 6 shows polyethylene terephthalate, or polyethylene terephthalate/isophthalate copolyester resin as a preferred example of the polyester resin used as the main component of the uppermost layer.

Claim 7 shows that a blended resin composed of 1 to 99 weight % of polyester resin shown in formula (1) and 1 to 99 weight % of poly carbonate resin shown in formula (2) is applicable as the uppermost layer.

Claim 8 shows that a composite resin covered metallic sheet of which one side or both sides are laminated with composite resin film disclosed in any claim 1 to 7.

Claim 9 shows a composite resin covered metallic sheet wherein when the thickness of the resin layers of the uppermost layer, the intermediate layer and the lowermost layer are $T_1$, $T_2$ and $T_3$, respectively, the particularly preferable thickness ratio of them satisfies the following formulas (3), (4) and (5):

$T2/(T1+T2+T3) \geq 0.4$ (3)

$T1 \geq 1 \, \mu m$ (4)

$T3 \geq 0.5 \, \mu m$ (5)

The Best Manner to Practice the Present Invention

The aforementioned objective of the present invention can be attained composing the resin film as a three layered one in which each layer is allotted a function required for can stock material. Namely, the aforementioned objective can be attained by designing a film in which the lowermost layer mainly secures adhesion to a metallic sheet during forming, the intermediate layer mainly secures impact resistance, and the uppermost layer mainly secures flavor retention ability.

Moreover, in order to concurrently reconcile adhesion during forming and impact resistance, which are particularly critical properties in the present invention, not only was the resin film designed to have three layers, of which each was allotted a function, but also to reduce the forming stress caused in the resin of intermediate layer during forming. A detailed study was carried out in selecting the resin composition of the intermediate layer so as to secure the impact resisting function which the intermediate layer is allotted and not to hinder the adhesion function of the lower layer as much as possible. In addition, it is designed so that cracks in each resin layer during forming are not generated, and peeling off of the resin between each resin layer does not take place. More concretely, the resin layer that is to be in contact with the metallic sheet, that is, the lowermost layer of the resin layer to be laminated, is mainly composed of polyester resin having inferior impact resistance but superior adhesion to the metallic sheet, which secures mainly adhesion during forming. The intermediate layer secures impact resistance and more excellent formability than that of polycarbonate resin alone by blending polycarbonate resin having definite structure which is not excellent in the adhesion to the metallic sheet but excellent in impact resistance, especially at a low temperature, and polyester resin having definite structure. The uppermost layer is mainly composed of polyester resin having definite structure which is excellent in barrier ability and which scarcely affects the flavor. Thus, a triple layered resin film and a resin covered metallic sheet, which can be formed by the aforementioned heavy forming after the resin film is laminated on a metallic sheet, and which satisfy the properties essential for can stock such as flavor retention ability, impact resistance at the low temperature and so on, can be obtained.

The present invention will be explained in detail referring to examples.

The polyester resin which is the main component of the uppermost layer and the lowermost layer, and one of the components of the intermediate layer is a polymer mainly composed of a recurring unit having the basic structure shown in the following formula (1):

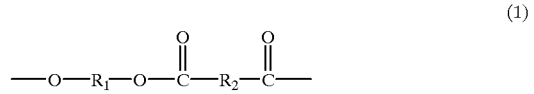

wherein $R_1$ is alkylene group of carbon number 2 to 6, and $R_2$ is alkylene group or allylene group of carbon number 2 to 24.

The polyester resin, which is a main component of the lowermost layer of the composite resin film of the present invention, is mainly selected from the view point of the adhesion to a metallic sheet during forming and to the intermediate layer which comprises a blended resin layer of poly carbonate and polyester resin. Polyester resin to be selected, which is a polymer mainly composed of a recurring unit having the basic structure shown in the aforementioned formula (1), is preferably one of polyethylene terephthalate, poly-butylene terephthalate, copolyester resin mainly composed of ethylene terephthalate unit and copolyester resin mainly composed of butylene terephthalate unit, or a blend of more than one of them. And as a copolyester, polyethylene terephthalate/isophthalate, polyethylene terephthalate/sebacate, polyethylene terephthalate/adipate or polybutylene terephthalate/isophthalate is preferable. In addition, in case where especially firm impact resistance is required in the resin film in such a use that the extent of the forming into can stock is not so large and content packed in it is greatly corrosive, or content which is required pasteurization in hot steam after being packed is packed into can stock, the blended resin composed of 1 to 99 weight % of polyester resin comprising the recurring unit of the basic structure shown in the aforementioned formula (1) and 1 to 99 weight % of polycarbonate shown in the following formula (2) is preferable. In case where less than 1 weight % of polycarbonate is blended, the improvement of impact resistance that is the objective of blending polycarbonate, is scarcely attained, while in case where polycarbonate exceeding 99 weight % is blended, the stable adhesion during forming, which is the function that the lowermost layer is allotted, is not secured, which is unfavorable. More preferable blending ratio of poly carbonate is 1 to 80 weight %.

Formula (2):

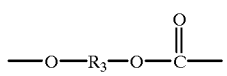

wherein $R_3$ is aliphatic hydrocarbon of carbon number 2 to 10 or aromatic hydrocarbon of carbon number 6 to 18

In these polycarbonate, taking into consideration of impact resistance, heat resistance and retort resistance required for can stock material, aromatic polycarbonate is more preferable than aliphatic polycarbonate. For example, di-oxy-di-phenyl-2,2-propane polycarbonate, di-oxy-di-phenyl methane polycarbonate, di-oxy-di-phenyl ethane polycarbonate, di-oxy-di-phenyl-2,2-butane polycarbonate, dioxy-2,2-pentane polycarbonate, di-oxy-di-phenyl-3,3-pentane polycarbonate, di-oxy-di-phenyl-2,2-hexane polycarbonate or the like, which is aromatic polycarbonate in which alkyl group combines with carbon of central methane of 4,4-dioxydiphenyl methane carbonate, is preferable. Especially, bisphenol A polycarbonate, which is general polycarbonate, is more preferable from the view point of impact resistance, heat resistance, formability and economical efficiency.

Next, the polycarbonate, which is one of the resin component composing the blended resin of the intermediate layer, is the polymer consisting of the recurring unit of the basic structure shown in the aforementioned formula (2), and another resin component is the polymer consisting of the recurring unit of the basic structure shown in the aforementioned formula (1). The especially favorable resin of these polycarbonate is aromatic polycarbonate rather than aliphatic polycarbonate as same as mentioned above. For example, di-oxy-di-phenyl-2,2-propane polycarbonate, di-oxy-di-phenyl methane polycarbonate, di-oxy-di-phenyl ethane polycarbonate, di-oxy-di-phenyl-2,2-butane polycarbonate, dioxy-2,2-pentane polycarbonate, di-oxy-di-phenyl-3,3-pentane polycarbonate, di-oxy-di-phenyl-2,2-hexane polycarbonate or the like, which is aromatic polycarbonate in which alkyl group combines with carbon of central methane of 4,4-dioxydiphenyl methane carbonate, is preferable. Especially, bisphenol A poly carbonate is more preferable from the view point of impact resistance, heat resistance, formability and economical efficiency. In relation to the polyester resin, the especially favorable one of them shown in the aforementioned formula (1) is also polyethylene terephthalate, poly-butylene terephthalate, copolyester resin mainly composed of ethylene terephthalate unit and copolyester resin mainly composed of butylene terephthalate unit, or a blend of more than one of them as same as mentioned above. The intermediate layer requires not merely an available resin type but a blended resin composed of polycarbonate and polyester resin comprising the recurring unit of definite basic structure, and further requires that both resins should be blended in the proper blending ratio. The preferable blending ratio is 1 to 99 weight % of polycarbonate bearing to 1 to 99 weight % of polyester resin. In case where less than 1 weight % of polycarbonate is blended, it is difficult to secure the impact resistance, while in case where polycarbonate exceeding 99 weight % is blended, elongation of the resin is reduced and forming stress is increased during forming, which is apt to cause unfavorable peeling off of the resin film after forming or cracks in the resin film. More preferable blending ratio of poly carbonate is 1 to 80 weight %.

On the other hand, the polyester resin, which is a main component resin composing the uppermost layer, is applied in order to prevent the flavor variance affection, that is a weak point of polycarbonate blended to the intermediate layer which greatly absorbs flavor ingredient when it directly contacts the content packed in a can and affects flavor. It is selected from the polyester resins shown in the aforementioned formula (1) . Of these resins, polyethylene terephthalate, polyethylene terephthalate/isophthalate copolymer or blended resin of these resins is preferable from the view point of flavor retention ability and adhesion to the blended resin layer of the intermediate layer comprising polycarbonate and polyester resin. In addition, from the view point of flavor retention ability, these resins are preferably polymerized ones in the solid phase, which involves less low molecule component such as oligomer or aldehyde component, rather than those polymerized in the liquid phase. Furthermore, it is effective for the use where an especially corrosive content is packed that the blended resin composed of 1 to 99 weight % of this polyester resin and 1 to 99 weight % of polycarbonate shown in formula (2) is applied as long as the use is such that the packed content does not require strict flavor retention ability. In case where less than 1 weight % of polycarbonate is blended, effect of blending is not attained, while in case where polycarbonate exceeding 99 weight % is blended, flavor retention ability might be unfavorably detracted. More Preferable blending ratio of poly-carbonate is 1 to 80 weight %. Taking into consideration the impact resistance as well as heat resistance and retort resistance required for can stock material, as in the case of the intermediate layer, aromatic polycarbonate is more preferable than aliphatic polycarbonate. For example, di-oxy-di-phenyl-2,2-propane polycarbonate, di-oxy-di-phenyl methane polycarbonate, di-oxy-di-phenyl ethane polycarbonate, di-oxy-di-phenyl-2,2-butane polycarbonate, dioxy-2,2-pentane polycarbonate, di-oxy-di-phenyl-3,3-pentane polycarbonate, di-oxy-di-phenyl-2,2-hexane polycarbonate or the like, which is aromatic polycarbonate in which alkyl group combines with carbon of central methane of 4,4-dioxydiphenyl methane carbonate, is preferable. Especially, bisphenol A poly-carbonate is more preferable from the view point of impact resistance, heat resistance, formability and economical efficiency.

In relation to the resin composition of the intermediate layer, the blended resin comprising the intermediate layer composed of polycarbonate and polyester resin is preferable for attaining stably excellent formability and impact resistance whereby a sample of this blended resin, obtained by thermally melted same in the nitrogen atmosphere by heating for 10 seconds to the temperature of (the melting point+30° C.) followed by dipping into the water at 0° C. immediately after the melting, has not less than 170% of elongation at the break measured by the method shown in ASTM D638. The melting point of the resin in this context is the temperature corresponding to the maximum depth of the endothermic peak based on the melt of the resin continuously heated at the heating speed of 10° C./min using differential scanning calorimeter (SS 10, produced by Seiko Denshi Kogyo Co., Ltd). In case where more than one endothermic peaks are present, the higher temperature corresponding to the maximum endothermic peak is basically used as the melting point, but the lower temperature is also available as the melting point as long as the properties can be satisfied. The molecular weight and distribution of it of each resin composing the lowermost layer, the intermediate layer and the uppermost layer also affect the properties. In general, the resin having higher molecular weight and narrower distribution of it tends to be superior in the impact resistance, but as the resin having lower molecular weight is more economical and is easily formed into a film, the molecule weight is selected according to the requested properties and not particularly defined in the present invention. Although the distribution of the molecule weight should also be defined according to the requested properties, it is noteworthy that in case where the resin has excessively wide molecule weight distribution, especially involving large amount of low molecule component (such as oligomer), they may be extracted into the content and affect its flavor. In addition, in the possible case where the flavor is affected by the extraction of the component which is contained in the resin and which is easily extracted, that is, the aforementioned low molecule weight component or metal ion extracted from the resin film contacting the content packed into a can, it is preferable to apply the resin having component that is extracted as little as possible for the resin composing each layer, particularly the uppermost layer. Furthermore, another resin layer such as that of thermosetting resin involving epoxy resin or thermoplastic resin can be formed on or under the three layered resin film of the present invention, if necessary, but it should be formed as not to detract the features of the three layered resin film.

Next, the thickness of each resin layer should basically be determined based on the use and the required properties when the composite resin film is laminated to a metallic sheet. When the composite film is used in the condition that it is laminated to a metallic sheet and the laminated metallic sheet is formed into a can body, it is preferably a three layered composite resin layer which satisfies the following formulae (3), (4) and (5), when the thickness of the uppermost layer, the intermediate layer and the uppermost layer of the three layered resin film are $T_1$, $T_2$ and $T_3$, respectively, as long as the packed content is not a specific one.

[Favorable conditions of the thickness of each layer]

$$T_2/(T_1+T_2+T_3) \geq 0.4 \quad (3)$$

$$T_1 \geq 1 \ \mu m \quad (4)$$

$$T_3 \geq 0.5 \ \mu m \quad (5)$$

In case where $T_1$ is less than 1 μm, the flavor retention ability cannot be secured sufficiently. In case where $T_3$ is less than 0.5 μm, the stable adhesion cannot be secured sufficiently depending on the condition of the metallic sheet to be laminated. In case where $T_2/(T_1+T_2+T_3)$ is less than 0.4, the impact resistance of the intermediate layer cannot be displayed sufficiently depending on conditions of the use.

Furthermore, from the view point of the stable lamination of the above-mentioned three layered resin film on a metallic sheet, it is preferable that the melting point of the resin composing the uppermost layer is above ($T_{m1}$+3° C.) when the melting point of the resin composing the lowermost layer of the aforementioned three layered resin film is $T_{m1}$, since the stable appearance of the laminated resin film is obtained and the resin film hardly adheres to a laminating roll. In case where the melting point of the resin composing the uppermost layer is less than ($T_{m1}$+3° C.), when using a laminating roll having the rubber lining of which surface is roughly ground exceedingly or having fine uneven defects on the surface in the later-described process where the three layered resin film of the present invention is laminated to a metallic sheet, these surface roughness is printed on the resin surface and the appearance of the resin covered metallic sheet is apt to be deteriorated. Therefore, the surface of the laminating roll should strictly be cared so as to stably obtain the favorable appearance of the resin film.

The composite resin covered metallic sheet can be obtained not only by a method in which the aforementioned three layered resin film is laminated on a metallic sheet, but also by another method in which each resin layer, that is the uppermost layer, the intermediate layer or the lowermost layer, is separately laminated on a metallic sheet in order. For example, it is possible that after a two layered resin film that is to be the intermediate layer and the lowermost layer is laminated on a metallic sheet, the layer to be the uppermost layer is laminated on it. In this case, when the melting point is shown as $T_{m2}$, $T_{m2}$ is preferably above ($T_{m1}$+3° C.) for the same reason mentioned above, and that of the resin composing the uppermost layer is preferably above ($T_{m2}$+3° C.). The following case of 1), 2) and 3) are examples of the three layered resin film of which the resin composing the uppermost layer has the melting point above ($T_{m1}$+3° C.).

[Examples of the Structure of the Three Layered Resin Film]

1) A three layered resin film comprised of an uppermost layer of polyethylene terephthalate, an intermediate layer of blended resin consisting of copolymer of polyethylene terephthalate/isophthalate (6 mole of isophthalic acid is involved in 100 mole of total acid component in the polymerization), polybutylene terephthalate and bisphenol A polycarbonate, and a lowermost layer of copolymer of polyethylene terephthalate/isophthalate in which 7 mole of isophthalic acid is involved in 100 mole of total acid component in the polymerization;

2) A three layered resin film comprised of an uppermost layer of copolymer of polyethylene terephthalate/isophthalate in which 5 mole of isophthalic acid is involved in 100 mole of total acid component in the polymerization, an intermediate layer of blended resin consisting of copolymer of polyethylene terephthalate/isophthalate in which 9 mole of isophthalic acid is involved in 100 mole of total acid component in the polymerization, polybutylene terephthalate and bisphenol A polycarbonate, and a lowermost layer of the blended resin having the same resin composition as that of the intermediate layer except that the blending ratio of polycarbonate is much smaller;

3) The same three layered resin film as that of the aforementioned 1) except that polybutylene terephthalate is not blended in the resin of the intermediate layer The melting point of the resin in this context refers to the temperature corresponding to the maximum depth of the endothermic peak due to the melt of the resin continuously heated at the heating speed of 10° C./min using differential scanning calorimeter (SS 10, produced by Seiko Denshi Kogyo Co., Ltd). In case where more than two endothermic peaks are present, the higher temperature corresponding to the maximum endothermic peak is basically used as the melting point. However, in case where the covering stability is not so greatly affected for the reason that the blended amount of resin affecting the highest temperature corresponding to the maximum depth of the endothermic peak is small, it is not necessary to have the highest temperature as the melting point, and the lower temperature corresponding to the maximum depth of the other endothermic peak than the highest temperature corresponding to the maximum depth of the endothermic peak can be used as the melting point. However, even if using a three layered resin film of which conditions are not within the previously mentioned preferable range from the view point of the stable lamination to a metallic sheet, it can be laminated to a metallic sheet in a favorable condition by controlling the surface of the laminating roll and selecting the laminating conditions such as the surface temperature of the laminating roll, and so on. Therefore, the favorable conditions of the melting point of each resin layer of the three layered resin film is not indispensable conditions but favorable ones.

Furthermore, the forming in which the can wall portion is thinned more than usual, desirably more than 40%, is extremely heavy for the resin film as mentioned above. Therefore, the properties such as corrosion resistance after the resin covered metallic sheet is formed into a can body can only be within a range for the practical use by using the three layered resin film of the present invention at least as the covering material for the inner surface of the can. In case where more heavy forming is practiced, for example the can wall portion is thinned more than 40% and added with a further reinforcement forming of can wall such as bead forming in order to reinforce the strength of the can wall portion, when more corrosive content is packed, there may be a case where the practical properties cannot be satisfied even if the three layered resin film of the present invention is used as the covering material for the inner surface of the can. In the present invention, as a result of several trials for this case, it was found that the practical properties can be obtained by considering the melting point of the resin layer to be laminated on the inner and outer surfaces of a metallic sheet of which both sides are laminated with resin film.

Concretely, by having the resin films laminated on the inner and outer surface of a can as to satisfy the following conditions ①, ② and ③, adhesion of a can body to the mesh of the oven and adhesion among can bodies due to the melting of the resin film laminated on the outer surface of a can, during the heating process after forming, can be avoided. In addition, it is found that heating the can body before or after the reinforcement forming of the can wall and melting the intermediate layer or the lowermost layer of the three layered resin film laminated on the inner surface of a can makes it possible to reduce the strain of the resin film due to forming, the deterioration of impact resistance, and film damage due to immoderate crystallization, thus satisfying the required properties even if the aforementioned reinforcement forming of the can wall is added.

In case where the above described reinforcement forming of the can wall is added, the following conditions ② or ③ is more effective in reducing the aforementioned unfavorable properties, but as condition ③ can reduce the properties such as decomposed product which affects the flavor of the content, when the surface resin layer is melted at too high a temperature for too much period of time, it is essential to avoid heating the can body at an unnecessarily high temperature for too much period of time.

Condition ① is also available for recovering the adhesion reduced by forming and improving impact resistance accompanied by the recovering of adhesion. The selection of the below-described condition ① to ③ should be determined due to required properties, so it is not particularly specified in the present invention.

<Favorable Conditions of Resin Films to be Laminated on the Inner and Outer Surface of a Can in Case Where the Reinforcement Forming of the Can Wall is Added>

① A metallic sheet of which both sides are covered with resin film, wherein one side of the metallic sheet is laminated with the aforementioned three layered resin film used as the covering material for the inner surface of the can, and the other side of it is laminated with a resin film having at least resin layer as the uppermost layer mainly composed of a resin having a melting point which is more than 5° C. higher than that of a resin component of the intermediate layer or the lowermost layer of the aforementioned three layered resin film.

② A metallic sheet of which both sides are covered with resin film, wherein one side of the metallic sheet is laminated with the aforementioned three layered resin film used as the covering material for the inner surface of the can, and the other side of it is laminated with a resin film having at least resin layer as the uppermost layer mainly composed of a resin having a melting point which is more than 5° C. higher than that of both resin components of the intermediate layer and the lowermost layer of the aforementioned three layered resin film.

③ A metallic sheet of which both sides are covered with resin film, wherein one side of the metallic sheet is laminated with the aforementioned three layered resin film used as the covering material for the inner surface of the can, and the other side of it is laminated with a resin film having at least resin layer as the uppermost layer mainly composed of a resin having a melting point which is more than 5° C. higher than that of all the resin components of the uppermost layer, the intermediate layer and the lowermost layer of the aforementioned three layered resin film.

In case where a resin film is laminated only on the one side to be the inner surface of the can, it is not necessary to take into consideration so much about the melting point of the metal plated on the outer surface as shown in ① to ③, since the outer surface is generally covered with a thin metal plating layer having a high melting point and not bonding with other metals. But in some cases where the outer surface is plated with comparatively large amount of tin having low melting temperature, even if the outer surface is not covered with resin film but covered with metal plating, the melting point of the resin component of the three layered resin film used as the covering material for the inner surface of the can and that of plating layer formed on the outer surface might have to be taken into consideration as in ① to ③, so a careful attention is required.

The melting point in this context refers to the same value measured as mentioned above. The conditions ① to ③ are also useful in case where the reinforcement forming for the can wall is not added, for example in the case of forming of a can body at an extremely high ratio in thinning the can wall thickness. Applying the above-described condition ① to ③ or not should be determined due to the required properties.

A proper amount of stabilizer, antioxidant, antistatic agent, pigment, lubricant or corrosion inhibitor may be added in the resin used as each resin layer as occasion demands as long as it does not deteriorate properties such as the flavor and so on. The composite film before being laminated on a metallic sheet may be one which is un-oriented, mono-axially oriented or bi-axially oriented. However, excessive orientation retained in the film after the lamination unfavorably affects the formability or the adhesion. When moderate orientation is retained in the film after the lamination, the improvement of the properties for can stock material such as impact resistance can be expected rather than in the un-oriented state. However, an un-oriented film has the advantage such that it can be produced with inexpensive facilities, and the required properties can be fully attained in an un-oriented state using the resin film having the resin composition and the structure of the present invention in almost every case except in special cases. (For example, when a resin covered metallic sheet, wherein a resin film is laminated on a soft steel sheet having 0.1 mm of thickness and low hardness, is formed into a can body, the can bottom portion is greatly dented even by a slight impact and the resin film is considerably damaged. It is impossible to pack greatly corrosive content into such a can from the view point of the corrosion resistance.) Furthermore, since adjustment of the degree of orientation is not required, the range of the laminating temperature is widened when a resin film is laminated on a metallic sheet by heat bonding, and a resin film covered metallic sheet is easily produced. However, in relation to the lamination using mono-axially oriented resin or bi-axially oriented resin film, it is easier to produce a resin covered metallic sheet by having the degree of orientation of mono-axially oriented or bi-axially oriented resin film to be under a certain level (including un-oriented state) after the lamination rather than adjusting the degree of orientation to be within a suitable range by controlling it in a narrow, suitable temperature range for lamination. Selecting the resin film after lamination to be either a resin layer having the degree of orientation which is within a suitable range or one having the degree of orientation which is under a certain level (un-oriented state included) has both merits and demerits, so it should be selected according to the required properties.

Next, as a metallic sheet for the resin covered metallic sheet of the present invention, a sheet or strip of steel or aluminum (including aluminum alloy, the same hereinafter) is used, preferably one having a film of hydrated chromium oxide on its surface. In particular, a steel sheet having a double layered film comprised of a lower layer of metallic chromium and an upper layer of hydrated chromium oxide, the so-called TFS, is preferably used. In addition, a steel sheet having been plated on its surface with a multi-layered plating or alloy plating of one or more than two of tin, nickel, zinc and so on, the upper layer being further covered with the aforementioned double layered TFS film or a film of hydrated chromium oxide, or an aluminum sheet which is treated by phosphate-chromate treatment or covered with a layer of hydrated chromium oxide after the surface of it is cleansed is used as a metallic sheet of the present invention. Regardless that it is a steel or an aluminum, the one having a layer of hydrated chromium oxide formed on its surface has effective adhesion to the composite resin layer during forming. The weight of the layer of hydrated chromium oxide should be suitable, and it is preferably 3 to 30 mg/m$^2$ as chromium. When it is less than 3 mg/m$^2$ or it exceeds 30 mg/m$^2$, the adhesion during forming is not so much improved.

It goes without saying that the three layered composite resin film of the present invention should steadily be heat-bonded to a metallic sheet. Heat bonding can be attained as follows: for example, pressing a resin layer to bond to a heated metallic sheet using a couple of laminating roll and melting the resin at least near the metallic sheet, followed by solidifying it by cooling.

Next, the example of the production method of the composite resin covered metallic sheet of the present invention will be described. The following methods can be considered as the production methods of the composite resin covered metallic sheet of the present invention.

(1) A three layered composite resin film is contacted to a heated metallic sheet to be pressed to be laminated.

(2) Each resin film composing the uppermost layer, the intermediate layer and the lowermost layer, respectively, is separately laminated to a heated metallic sheet or each resin film is concurrently laminated to a heated metallic sheet.

(3) A three layered composite resin film in the thermally melted state, wherein the resins composing the uppermost layer, the intermediate layer and the lowermost layer are thermally melted and co-extruded, is extruded on a heated metallic sheet to be laminated. The followings are examples.

1) A three layered composite resin film, wherein the uppermost layer is mainly composed of the aforementioned polyester resin, the intermediate layer is the aforementioned blended resin of poly-carbonate and polyester, and the lowermost layer is mainly composed of the aforementioned polyester resin, is contacted on one side or both sides of a metallic sheet heated to the temperature of the melting point of the resin to be the lowermost layer $(Tm_1)$ to $Tm_1+150°$ C., and then both the resin film and the metallic sheet are pinched to be pressed together and to be laminated using a couple of laminating roll of which the surface temperature is controlled, followed by gradual cooling or quenching.

2) A two layered composite resin film, wherein the lowermost layer is mainly composed of polyester resin, the intermediate layer is a blended resin of poly-carbonate and polyester, is laminated on one side or both sides of a metallic sheet heated to the temperature of the melting point of the resin to be the lowermost layer $(Tm_1)$ to $Tm_1+150°$ C., so that the resin layer to be the lowermost layer is in contact with the metallic sheet, and then the resin layer to be the uppermost layer is further laminated on the composite resin covered metallic sheet heated to the temperature of the melting point of the resin to be the uppermost layer $(Tm_2)$ to $Tm_2+150°$ C., and then gradually cooled slowly or quenched.

3) A three layered composite resin film in the thermally melted state, wherein the uppermost layer is mainly composed of the aforementioned polyester resin, the intermediate layer is the aforementioned blended resin of poly-carbonate and polyester, and the lowermost layer is mainly composed of polyester resin, is directly extruded to be laminated on one side or both sides of a metallic sheet heated to the glass transition temperature of the resin to be the lowermost layer $(Tg)+30°$ C. to the melting point $(Tm_1)+150°$ C., followed by gradual cooling or quenching.

The cited glass transition temperature (Tg) in this contact refers to the boundary temperature where a resin changes from the glass state into the gum state. It can be determined by measuring the specific volume and drawing a specific volume-temperature curve, wherein it can be shown as the temperature corresponding to that a bend starts on the curve. In case where there are more than one temperature that a bend starts on the curve, the higher temperature of it is used as the glass transition temperature, but the lower temperature of it is also available as long as the properties are satisfactory.

In addition, there are several methods for heating a metallic sheet such as known burning wind heating, induction heating or heating roll, and each of them can be separately used or they can be used together. It goes without saying that the laminating conditions such as the heating temperature of a metallic sheet, the temperature of laminating roll, pressure of laminating roll and so on, or the cooling condition after the lamination of the composite resin film should be prudently selected in order that the features of the composite resin film used in the present invention are obtained and the required properties can be satisfied.

Embodiment

Examples and Comparative Examples of the Present Invention are Explained in Detail.

EXAMPLE 1 to 4

A resin covered metallic sheet of which both sides were laminated with resin film was obtained by concurrent laminating on the one side of the strip of TFS (metallic chromium: 105 mg/m$^2$, hydrated chromium oxide: 17 mg/m$^2$ as chromium, thickness: 0.21 mm, width :250 mm, Temper: T-5) heated to 270° C. by induction heating roll with an un-oriented three layered resin film (the thickness of the uppermost layer, the intermediate layer and the lowermost layer are 5, 17 and 3 μm) comprised of:

An uppermost layer of polyethylene terephthalate polymerized in solid phase (produced by Yunichika Inc. brand name: NEH-2050, melting point: 256° C.), An intermediate layer of blended resin comprising of bisphenol A poly-carbonate (produced by Japan GE plastic Inc. brand name: Rexane 154) and copolyester of polyethylene terephthalate/isophthalate of which acid component was composed of 90 mole % of terephtalic acid and 10 mole % of isophtalic acid (produced by Kurare Inc. brand name: KS 760 K) blended at the weight % ratio of 1:99, 20:80, 80:20 and 99:1 respectively (the melting temperature of each resin layer being 225, 224, 222, and 220° C., respectively), and a lowermost layer of blended resin (melting point: 246° C.) comprising of 60 weight % of polyethylene terephthalate (produced by Yunichika Inc. brand name: NEH-2050) and 40 weight % of polybutylene terephthalate (produced by Polyplastic Lnc. brand name: 700 FP), and on the other side of the strip of the TFS with an un-oriented single layered resin film (thickness: 13 μm) comprising:

a blended resin (melting point: 246° C.) comprising of 60 weight % of polyethylene terephthalate (produced by Yunichika Inc. brand name: NEH-2050) and 40 weight % of polybutylene terephthalate (produced by Polyplastic Inc. brandname: 700 FP)

using a couple of laminating roll having the surface temperature of 90° C. at the laminating speed of 80 m/minute, then immediately dipping into water and cooling.

Comparative Example 1

A resin covered metallic sheet of which both sides were laminated with resin film was obtained by laminating on the one side of the same TFS as that of Example 1 with an un-oriented three layered resin film comprised of:

an uppermost layer of the same polyethylene terephthalate as that of Example 1 an intermediate layer only composed of the same copolyester of polyethylene terephthalate/isophthalate as that of Example 1, and a lowermost layer of the same blended resin comprising of polyethylene terephthalate and poly-butylene terephthalate, (the thickness of each layer was the same as that of Example 1), and on the other side of the aforementioned TFS with the same single layered resin film as that of Example 1 under the same conditions as that of Example 1, then immediately dipping into water and cooling.

Comparative Example 2

A resin covered metallic sheet of which both sides were laminated with resin film was obtained by laminating on the one side of the same TFS as that of Example 1 with an un-oriented three layered resin film comprised of:

an uppermost layer of the same polyethylene terephthalate as that of Example 1 an intermediate layer only composed of the same polycarbonate as that of Example 1 (melting point: 220° C.), and a lowermost layer of the same blended resin comprising of polyethylene terephthalate and polybutylene terephthalate, (the thickness of each layer was the same as that of Example 1), and on the other side of the aforementioned TFS with the same single layered resin film as that of Example 1 (the thickness was the same as that of Example 1) under the same conditions as that of Example 1, then immediately dipping into water and cooling.

EXAMPLE 5 to 8

A resin covered metallic sheet of which both sides were laminated with resin film was obtained using the same metallic sheet as that of Example 1 under the same laminating conditions and cooling condition as those of Example 1, except for using a composite resin film (the thickness of the uppermost layer, the intermediate layer and the lowermost layer were 5, 17 and 3 μm) comprised:

an uppermost layer of blended resin comprising of bisphenol A polycarbonate (produced by Japan GE plastic Inc. brand name: Rexane 154) and polyethylene terephthalate polymerized in solid phase (produced by Yunichika Inc. brand name: NEH-2050), blended at the weight % ratio of 1:99, 20:80, 80:20 and 99:1 (the melting temperature of each resin layer was 256, 249, 227, and 220° C., respectively), an intermediate layer of blended resin (melting point: 221° C.) comprising of 40 weight % of blended polyester resin composed of 50 weight % of copolyester of polyethylene terephthalate/isophthalate of which acid component was composed of 90 mole % of terephtalic acid and 10 mole % of isophtalic acid (produced by Kurare Inc. brand name: KS 760 K)

and 50 weight % of poly-butylene terephthalate (produced by Polyplastic Inc. brand name: 700 FP), and 60 weight % of bisphenol A poly-carbonate (produced by Japan GE plastic Inc. brand name: Rexane 154), and a lowermost layer of copolyester of polyethylene terephthalate/isophthalate of which acid component was composed of 90 mole % of terephtalic acid and 10 mole % of isophtalic acid (produced by Kurare Inc. brand name: KS 760 K, melting point: 225° C.).

Comparative Example 3

A resin covered metallic sheet of which both sides were laminated with resin film was obtained using the same metallic sheet as that of Example 1 on the same laminating conditions and cooling condition as those of Example 1, except for using the same composite resin film as that of Example 5 except that the uppermost layer of it was comprised the same bisphenol A polycarbonate as that of Example 5 alone.

EXAMPLE 9 to 12

A resin covered metallic sheet of which both sides were laminated with resin film was obtained using the same metallic sheet as that of Example 1 under the same laminating conditions and cooling condition as those of Example 1, except for using a composite resin film (the thickness of the uppermost layer, the intermediate layer and the lowermost layer were 5, 17 and 3 μm) comprising:

an uppermost layer of copolyester of polyethylene terephthalate/isophthalate of which acid component was composed of 90 mole % of terephtalic acid and 10 mole % of isophtalic acid (produced by Kurare Inc. brand name: KS 760 K, melting point: 225° C.), an intermediate layer (melting temperature: 221° C.) consisting 20 weight % of polyester resin composed of 50 weight % of copolyester of polyethylene terephthalate/isophthalate of which acid component was composed of 90 mole % of terephtalic acid and 10 mole % of isophtalic acid (produced by Kurare Inc. brand name: KS 760 K, melting point: 225° C.)

and 50 weight % of poly-butylene terephthalate (produced by Polyplastic Inc. brand name: 700 FP), and 80 weight % of bisphenol A poly-carbonate (produced by Japan GE plastic Inc. brand name: Rexane 154), and a lowermost layer of a blended resin comprising:

bisphenol A poly-carbonate (produced by Japan GE plastic Inc. brand name: Rexane 154) and blended polyester resin composed of 80 weight % of copolyester of polyethylene terephthalate/isophthalate of which acid component was composed of 90 mole % of terephtalic acid and 10 mole % of isophtalic acid (produced by Kurare Inc. brandname: KS 760 K) and 20 weight % of poly-butylene terephthalate (produced by Polyplastic Inc. brand name: 700 FP)

blended at the weight % ratio of 1:99, 20:80, 30:70 and 40:60 respectively (the melting temperature of them was 223, 222, 222, and 221° C., respectively).

Comparative Example 4

A resin covered metallic sheet of which both sides were laminated with resin film was obtained using the same metallic sheet as that of Example 1 under the same laminating conditions and cooling condition as those of Example 1, except for using the same composite resin film as that of Example 9 except that the lowermost layer of it was comprised the same bisphenol A poly-carbonate as that of Example 9 alone.

EXAMPLE 13 to 15

A resin covered metallic sheet of which both sides were laminated with resin film was obtained by laminating on the one side of the strip of nickel plated steel sheet having a layer of 700 mg/m² of nickel plating and another layer formed on it, which was 15 mg/M² as chromium of hydrated chromium oxide, (thickness 0.17 mm, width: 164 mm, Temper: T-5)

with a composite resin film comprising:

an uppermost layer and an intermediate layer comprising of the same resin as those of Example 9, and a lowermost layer of blended resin comprising:

bisphenol A poly-carbonate (produced by Japan GE plastic Inc. brand name: Rexane 154) and blended polyester resin composed of 80 weight % of copolyester of polyethylene terephthalate/isophthalate of which acid component was composed of 90 mole % of terephtalic acid and 10 mole % of isophtalic acid (produced by Kurare Inc. brand name: KS 760 K)

and 20 weight % of poly-butylene terephthalate (produced by Polyplastic Inc. brand name: 700 FP)

blended at the weight % ratio of 40:60, 80:20, and 99:1 respectively (the melting temperature of them was 221, 221, 221, and 220° C., respectively) (the thickness of the uppermost layer, the intermediate layer and the lowermost layer were 5, 17 and 3 μm, and the resin film width is 160 mm), leaving 2 mm marging which were not laminated on both sides in the width direction of the metal sheet, and on the other side of the strip of the nickel plated steel sheet with the same single layered resin film as that of Example 9 (the resin film width is 160 mm), leaving 2 mm marging which were not laminated on both sides on the width direction of the metal sheet, under the same laminating conditions and cooling condition as those of Example 1.

Comparative Example 5

A resin covered metallic sheet of which both sides were laminated with resin film was obtained under the same laminating conditions and cooling condition as those of Example 13, except for laminating on the same nickel plated steel sheet as that of Example 13 with the same resin film as that of Comparative Example 4.

EXAMPLE 16

A resin covered metallic sheet of which both sides were laminated with resin film was obtained under the same laminating conditions and cooling condition as those of Example 6, except for laminating on the one side of the strip of aluminum alloy JIS 3004 electrolytically treated in chromic acid and covered with TFS film (metallic chromium: 65 mg/m², hydrated chromium oxide: 8 mg/m² as chromium) having thickness of 0.21 mm and width of 250 mm, heated to 280° C. by induction heating roll with a three layered resin film comprising the same resin composition as that of Example 3 (the thickness of the uppermost layer, the intermediate layer and the lowermost layer are 1, 23.5 and 0.5 μm, respectively), except that the resin film was a bi-axially oriented one that was produced by elongating three times in the lengthwise and widthwise directions, respectively, at 110° C. and heat setting it at 200° C. for 30 seconds (production speed: 100 m/minute), and destroying the bi-axial orientation of all the resin layer (in the state that any clear peak due to resin crystalline plane can not be obtained even if measuring at the varied diffraction angle using the generally practiced X-ray diffraction method).

EXAMPLE 17

A resin covered metallic sheet of which both sides were laminated with resin film was obtained using the same metallic sheet as that of Example 6 and under the same laminating conditions and cooling condition as those of Example 6, except for using the same three layered un-oriented composite resin film having the same resin composition of the uppermost layer, the intermediate layer and the lowermost layer as that of Example 6, except that the thickness of each layer was 5, 10 and 10 μm, respectively.

The resin covered metallic sheets obtained in Example 1 to 11 and 16 to 17, and Comparative Example 1 to 4 were formed into can bodies so that the composite resin layer would be the inner surface of a can by drawing and 1 to 2 times of stretch-ironing after drawing under the conditions described below .

[Forming Conditions (Stretched-ironed Can)]
1. Blank diameter: 156 mm
2. Forming conditions of drawing
   Punch diameter: 88.5 mm
   Clearance between punch and die: 0.383 mm
   Blank-holding force: 2000 kg
   Temperature of the resin covered metallic sheet, punch and dies just before forming: 45° C.
3. Forming conditions of stretch-ironing
   1) First step
   Punch diameter: 66.5 mm
   Clearance between punch and die: 0.195 mm
   blank-holding force: 1000 kg
   Radius of curvature of die corner: 0.38 mm
   Temperature of resin covered metallic sheet, punch and dies just before forming: 65° C.
   2) Second step
   Punch diameter: 51.95 mm
   Clearance between punch and die: 0.143 mm
   Blank-holding force: 1000 kg
   Radius of curvature of die corner: 0.47 mm
   Temperature of the resin covered metallic sheet, punch and dies just before forming: 65° C.
Remarks)
   1) Average thinning ratio of can wall portion of finished can body: 42%
   2) The formed can was heated at 228° C. for 30 seconds so as to remove the strain in the resin film caused by forming.

After that, neck-in forming and franging forming were carried out using known methods.

Furthermore, the resin covered metallic sheets obtained in Example 13 to 15 and Comparative Example 5 were formed into welded cans so that the composite resin layer would be the inner surface of a can under the conditions described below.

[Forming Conditions (Welded Can)]
1. Shape of cut sheet before forming: The resin covered metal strip was cut at every 137 mm length and formed into blanks having a dimension of 137 mm (length)×164 mm (width).
2. Forming conditions
   The aforementioned blank was rounded so that the length direction of the blank corresponded to the circumferential direction of a can, and both edge portions, which were not covered with resin film in the width direction, were overlapped and welded. After that, it was formed into a welded can.

The properties of the stretched-Ironed cans and welded cans obtained as described above were evaluated using the following methods. The results were shown in Table 1 to 4.

(1) Adhesion during forming of the laminated resin layer
The presence of peeling-off of the laminated resin layer during each step of forming of stretched-ironed can formed under the conditions mentioned above were observed with naked eye. The case where peeling-off was not observed in the can through the final forming step was described as fair. In relation to the welded can, the case where peeling-off of the resin film was not observed when the both edge portions of the can body formed as described above were formed by neck-in forming and franging forming was described as fair.

(2) Flavor retention ability of the laminated resin layer
Fanta Orange (produced by Coca Cola Inc.) was packed into the obtained stretched-ironed cans and welded cans, and the lids, manufactured using a material having the same resin composition for the inner surface as that of the resin covered metallic sheet used for each can, were calked. After that, they were storaged for 3 weeks in the atmosphere having the temperature of 37° C. After the storage, they were opened and the flavor of the content was inspected by 100 appraisers. The case where not less than 90 appraisers evaluated that the flavor of the content before and after the storage had not varied was described as excellent, the case where not less than 60 appraisers evaluated the same was described as fair, and the case where less than 60 appraisers evaluated the same was described as poor.

(3) Impact resistance of the laminated resin layer at a low temperature
A test piece prepared from the center portion of the obtained can body, which had 30 mm of width in the circumferential direction, was dipped into ice water for 5 minutes, and then taken out. On the outer surface of the test piece having temperature about 5° C., a steel rod installed with a steel ball having a half inch diameter at the tip of it (weight: 1 kg) was dropped from the height of 40 mm to the center portion of the test piece at 15 mm interval in the circumferential direction. After that, a sponge impregnated with 3% of sodium chloride solution was contacted on the jutting portions formed on the inner surface of the test piece, dynamic current of 6.3 Volt was charged on the test piece, and the value of the flown current was measured. The impact resistance of the laminated resin layer to be the inner surface of a can at a low temperature was evaluated by the average value of the measured current values. It is described that the lower the current value, the less the cracks were caused in the resin film of the inner surface.

TABLE 1

The result of the evaluation of the properties of the resin covered metallic sheet (1)

Properties of resin covered metallic sheet

| Sample Number | Adhesion during forming | Flavor retention ability | Impact resistance at the low temperature (mA) |
| --- | --- | --- | --- |
| Example 1 | fair | excellent | 0.01 |
| Example 2 | fair | excellent | 0.00 |
| Example 3 | fair | excellent | 0.00 |
| Example 4 | fair | excellent | 0.00 |

TABLE 2

The result of the evaluation of the properties of the resin covered metallic sheet (2)

Properties of resin covered metallic sheet

| Sample Number | Adhesion during forming | Flavor retention ability | Impact resistance at the low temperature (mA) |
| --- | --- | --- | --- |
| Comparative Example 1 | fair | excellent | 0.12 |
| Comparative Example 2 | peeling-off was observed | — | — |

TABLE 2-continued

The result of the evaluation of the properties of the resin covered metallic sheet (2)

| | Properties of resin covered metallic sheet | | |
|---|---|---|---|
| Sample Number | Adhesion during forming | Flavor retention ability | Impact resistance at the low temperature (mA) |
| Example 5 | fair | excellent | 0.01 |
| Example 6 | fair | excellent | 0.00 |

Remarks—: not evaluated

TABLE 3

The result of the evaluation of the properties of the resin covered metallic sheet (3)

| | Properties of resin covered metallic sheet | | |
|---|---|---|---|
| Sample Number | Adhesion during forming | Flavor retention ability | Impact resistance at the low temperature (mA) |
| Example 7 | fair | fair | 0.00 |
| Example 8 | fair | fair | 0.00 |
| Comparative Example 3 | fair | poor | 0.00 |
| Example 9 | fair | excellent | 0.01 |
| Example 10 | fair | excellent | 0.00 |
| Example 11 | fair | fair | 0.00 |
| Example 12 | fair | fair | 0.00 |

TABLE 4

The result of the evaluation of the properties of the resin covered metallic sheet (4)

| | Properties of resin covered metallic sheet | | |
|---|---|---|---|
| Sample Number | Adhesion during forming | Flavor retention ability | Impact resistance at the low temperature (mA) |
| Comparative Example 4 | peeling-off was observed | — | — |
| Example 13 | fair | excellent | 0.00 |
| Example 14 | fair | fair | 0.00 |
| Example 15 | fair | fair | 0.00 |
| Comparative Example 5 | peeling-off was observed | — | — |
| Example 16 | fair | excellent | 0.00 |
| Example 17 | fair | fair | 0.00 |

Remarks—: not evaluated

Possibility of Industrial Use

The present invention relates to a three layered resin film comprised of an uppermost layer mainly composed of polyester resin having definite structure in order to secure the flavor retention ability, an intermediate resin layer composed of a blended resin of polyester resin and polycarbonate having definite structure in order to secure the impact resistance, and a lowermost layer mainly composed of polyester resin having definite structure in order to secure the adhesion to a metallic sheet during forming, and the resin film is to be laminated on a metallic sheet and then the resin covered metallic sheet is to be formed into a can. The resin covered metallic sheet of the present invention can be formed by heavy forming in which the can wall portion is thinned more than usual, and it is possible for the obtained can to secure the favorable flavor retention ability after the content is packed in to it and storaged for a certain period of time. Furthermore, it can secure the excellent corrosion resistance even if it is impacted from the outside before and after the content is packed in it.

Summary

A composite resin film, which can be formed by heavy forming in which the can wall portion is thinned more than usual when it is covered on a metallic sheet and the resin covered metallic sheet is formed into a can body, and favorably secures the flavor of the content after the can is packed with the content and storaged for a certain period of time, and further has excellent impact resistance in which cracks are not caused in the resin film by the outer impact before and after the can is packed with the content, is produced. And further, a resin covered metallic sheet laminated with the composite resin film is also produced. The resin covered metallic sheet is laminated with a three layered resin film comprised of an uppermost layer mainly composed of polyester resin, an intermediate resin layer composed of a blended resin of polyester resin and polycarbonate, and a lowermost layer mainly composed of polyester resin.

What is claimed is:

1. A composite resin film of three laminated resin layers comprising:
    an uppermost resin layer composed (A) entirely of polyester resin comprising
        the recurring unit shown in formula (1)

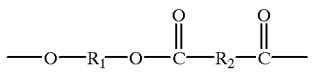
(1)

wherein $R_1$ is alkylene group of carbon number 2 to 6, and $R_2$ is alkylene group or allylene group of carbon number 2 to 24, or (B) a blend of (i) said polyester resin and (ii) 1–80% of a polycarbonate resin;

an intermediate resin layer composed of a blend of (i) 1 to 99 weight % of polyester resin comprising the recurring unit shown said formula (1) and (ii) 1 to 99 weight % of a polycarbonate resin comprising of the recurring unit shown in said formula (2)

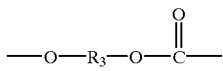
(2)

wherein $R_3$ is aliphatic hydrocarbon of carbon number 2 to 10 or aromatic hydrocarbon or carbon number 6 to 18; and a lowermost resin layer composed of a blend of (i) polyester resin comprising of the recurring unit shown in formula (1) and (ii) 1–99% by weight of polycarbonate resin comprising the recurring unit of said formula (2).

2. The composite resin film according to claim 1 wherein the polycarbonate resin involved in said intermediate layer is bisphenol A polycarbonate resin.

3. The composite resin film according to claim 1 wherein the polyester resin of said uppermost layer is polyethylene terephthalate or polyethylene terephthalate/isophthalate copolyester resin.

4. A composite resin covered metallic sheet of which at least one side is laminated with the composite resin film disclosed in claim 1.

5. The composite resin covered metallic sheet according to claim 4 wherein when the thickness of said uppermost layer, intermediate layer and lowermost layer are $T_1$, $T_2$ and $T_3$, respectively, they satisfy the following formulas (3), (4) and (5):

$$T2/(T1+T2+T3) \geq 0.4 \qquad (3)$$

$$T1 \geq 1\ \mu m \qquad (4)$$

$$T3 \geq 0.5\ \mu m \qquad (5).$$

6. The composite resin covered metallic sheet according to claim 5 wherein the metallic sheet is a steel sheet or an aluminum sheet of which surface has 3 to 30 mg/m² of hydrated chromium oxide film.

7. The composite resin covered metallic sheet according to claim 4 wherein the metallic sheet is a steel sheet or an aluminum sheet of which surface has 3 to 30 mg/m² of hydrated chromium oxide film.

8. The composite resin film of claim 1 wherein in said lowermost blended resin layer, said polyester resin is the main component and is selected from the group consisting of polyethylene terephthalate, polybutylene terephthalate, a copolyester resin mainly composed of ethylene terephthalate units, a copolyester resin mainly composed of butylene terephthalate units and a mixture of two or more of said resins.

9. The composite resin film according to claim 8 wherein the polycarbonate resin involved in said intermediate layer is bisphenol A polycarbonate resin.

10. The composite resin film according to claim 9 wherein the polyester resin said uppermost layer is polyethylene terephthalate or polyethylene terephthalate/isophthalate copolyester resin.

11. A composite resin covered metallic sheet of which at least one side is laminated with the composite resin film disclosed in claim 10.

12. The composite resin covered metallic sheet according to claim 11 wherein when the thickness of said uppermost layer, intermediate layer and lowermost layer are $T_1$, $T_2$ and $T_3$, respectively, they satisfy the following formulas (3), (4) and (5):

$$T_2/(T_1+T_2+T_3) \geq 0.4 \qquad (3)$$

$$T_1 \geq 1\ \mu m \qquad (4)$$

$$T_3 \geq 0.5\ \mu m \qquad (5).$$

13. The composite resin film according to claim 1 wherein said polyester resin of said intermediate blended resin layer is selected from the group consisting of polyethylene terephthalate, polybutylene terephthalate, a copolyester resin mainly composed of ethylene terephthalate units, a copolyester resin mainly composed of butylene terephthalate units and a mixture of two or more of said resins.

14. The composite resin film according to claim 13 wherein the polycarbonate resin involved in said intermediate layer is bisphenol A polycarbonate resin.

15. The composite resin film according to claim 14 wherein the polyester resin said uppermost layer is polyethylene terephthalate or polyethylene terephthalate/isophthalate copolyester resin.

16. A composite resin covered metallic sheet of which at least one side is laminated with the composite resin film disclosed in claim 15.

17. The composite resin covered metallic sheet according to claim 16 wherein when the thickness of said uppermost layer, intermediate layer and lowermost layer are $T_1$, $T_2$ and $T_3$, respectively, they satisfy the following formulas (3), (4) and (5):

$$T_2/(T_1+T_2+T_3) \geq 0.4 \qquad (3)$$

$$T_1 \geq 1\ \mu m \qquad (4)$$

$$T_3 \geq 0.5\ \mu m \qquad (5).$$

18. A composite resin covered metallic beverage can the interior of which is laminated with a composite resin film of claim 1, said composite resin film being located on the interior of said can, the lowermost layer of said composite resin film being securely adhered to the interior surface of said metallic can, wherein the intermediate layer of said composite resin film secures impact resistance, and the uppermost layer of said composite resin film secures flavor retention ability.

* * * * *